(12) United States Patent  (10) Patent No.: US 8,177,136 B2
Finnerty et al.  (45) Date of Patent: May 15, 2012

(54) EMBEDDED OPTICAL SIGNATURES IN DOCUMENTS

(75) Inventors: Fred W. Finnerty, Dawsonville, GA (US); Gary R. Streeter, Andover, MA (US); Kenneth E. Irwin, Jr., Dawsonville, GA (US)

(73) Assignee: Scientific Games International, Inc., Newark, DE (US)

( * ) Notice: Subject to any disclaimer, the term of this patent is extended or adjusted under 35 U.S.C. 154(b) by 0 days.

(21) Appl. No.: 12/914,185

(22) Filed: Oct. 28, 2010

(65) Prior Publication Data

US 2011/0127332 A1    Jun. 2, 2011

Related U.S. Application Data

(63) Continuation of application No. 11/391,746, filed on Mar. 29, 2006, now Pat. No. 7,837,117, which is a continuation-in-part of application No. 11/288,629, filed on Nov. 29, 2005, now Pat. No. 7,364,091, which is a continuation-in-part of application No. 11/014,159, filed on Dec. 16, 2004, now Pat. No. 7,252,222.

(60) Provisional application No. 60/531,179, filed on Dec. 19, 2003.

(51) Int. Cl.
    *G06K 19/06*    (2006.01)
(52) U.S. Cl. ......... 235/491; 235/494; 235/454; 235/375
(58) Field of Classification Search .................. 235/491, 235/454, 494, 381, 378–379, 375; 283/93–94, 283/901, 903

See application file for complete search history.

(56) References Cited

U.S. PATENT DOCUMENTS

| | | |
|---|---|---|
| 1,527,929 A | 2/1925 | Simons |
| 3,089,123 A | 5/1963 | Hennis at al. |
| 3,245,697 A | 4/1966 | BNugent |
| 3,699,311 A | 10/1972 | Dunbar |
| 3,736,368 A | 5/1973 | Vogelman et al. |
| 3,826,499 A | 7/1974 | Lenkoff |
| 3,868,057 A | 2/1975 | Chavez |
| 3,876,865 A | 4/1975 | Bliss |
| 3,902,253 A | 9/1975 | Sabuzawa et al. |
| 3,918,174 A | 11/1975 | Miller et al. |
| 3,922,529 A | 11/1975 | Orloff |
| 3,934,120 A | 1/1976 | Maymarev |
| 3,982,102 A | 9/1976 | Cidade |
| 4,017,834 A | 4/1977 | Cuttill et al. |

(Continued)

FOREIGN PATENT DOCUMENTS

AU    B-18428/92    12/1992

(Continued)

OTHER PUBLICATIONS

Chip Brown, 'Austin American-Statesman', (Article), Masy 28, 1998, 2 Pgs., Texas.

(Continued)

*Primary Examiner* — Edwyn Labaze
(74) *Attorney, Agent, or Firm* — Dority & Manning, P.A.

(57) ABSTRACT

A method of embedding an optical signature in a document and document produced therefrom. The optical signature uses an invisible optical pattern or covering that can reflect light in non-visible wavelengths, such as light in infrared, or fluoresces when exposed to a particular wavelength of light, such as ultra-violet light. The invisible optical pattern can be a covering over another optical pattern, or a base pattern upon which a second optical pattern is embedded.

7 Claims, 4 Drawing Sheets

U.S. PATENT DOCUMENTS

| | | |
|---|---|---|
| 4,095,824 A | 6/1978 | Bachman |
| 4,105,156 A | 8/1978 | Dethloff |
| 4,176,406 A | 11/1979 | Matkan |
| 4,191,376 A | 3/1980 | Goldman et al. |
| 4,194,296 A | 3/1980 | Pagnozzi et al. |
| 4,195,772 A | 4/1980 | Nishimura |
| 4,206,920 A | 6/1980 | Weatherford et al. |
| 4,241,942 A | 12/1980 | Bachman |
| 4,243,216 A | 1/1981 | Mazumder |
| 4,273,362 A | 6/1981 | Carrier et al. |
| 4,309,452 A | 1/1982 | Sachs |
| 4,313,087 A | 1/1982 | Weitzen et al. |
| 4,355,300 A | 10/1982 | Weber |
| 4,375,666 A | 3/1983 | Buck et al. |
| 4,398,708 A | 8/1983 | Goldman et al. |
| 4,407,443 A | 10/1983 | McCorkle |
| 4,451,759 A | 5/1984 | Heynisch |
| 4,455,039 A | 6/1984 | Weitzen et al. |
| 4,457,430 A | 7/1984 | Darling et al. |
| 4,464,423 A | 8/1984 | LaBianca et al. |
| 4,466,614 A | 8/1984 | Bachman et al. |
| 4,488,646 A | 12/1984 | McCorkle |
| 4,491,319 A | 1/1985 | Nelson |
| 4,494,197 A | 1/1985 | Troy et al. |
| 4,536,218 A | 8/1985 | Ganho |
| 4,544,184 A | 10/1985 | Freund et al. |
| 4,579,371 A | 4/1986 | Long et al. |
| 4,591,189 A | 5/1986 | Holmen et al. |
| 4,634,149 A | 1/1987 | Donovan |
| 4,665,502 A | 5/1987 | Kreisner |
| 4,669,729 A | 6/1987 | Solitt et al. |
| 4,689,742 A | 8/1987 | Troy et al. |
| 4,726,608 A | 2/1988 | Walton |
| 4,736,109 A | 4/1988 | Dvorzsak |
| 4,740,016 A | 4/1988 | Konecny et al. |
| 4,760,247 A | 7/1988 | Keane et al. |
| 4,763,927 A | 8/1988 | Schneider |
| 4,764,666 A | 8/1988 | Bergeron |
| 4,775,155 A | 10/1988 | Lees |
| 4,792,667 A | 12/1988 | Chen |
| 4,805,907 A | 2/1989 | Hagiwara |
| 4,817,951 A | 4/1989 | Crouch et al. |
| 4,835,624 A | 5/1989 | Black et al. |
| 4,836,546 A | 6/1989 | Dire et al. |
| 4,836,553 A | 6/1989 | Suttle et al. |
| 4,837,728 A | 6/1989 | Barrie et al. |
| 4,856,787 A | 8/1989 | Itkis |
| 4,861,041 A | 8/1989 | Jones et al. |
| 4,870,260 A | 9/1989 | Niepolomski et al. |
| 4,880,964 A | 11/1989 | Donahue |
| 4,888,964 A | 12/1989 | Klinge |
| 4,892,310 A | 1/1990 | Patterson |
| 4,922,522 A | 5/1990 | Scanlon |
| 4,943,090 A | 7/1990 | Fienberg |
| 4,960,611 A | 10/1990 | Fujisawa et al. |
| 4,961,578 A | 10/1990 | Chateau |
| 4,964,642 A | 10/1990 | Kamille |
| 4,996,705 A | 2/1991 | Entenmann et al. |
| 4,998,010 A | 3/1991 | Chandler et al. |
| 4,998,199 A | 3/1991 | Tashiro et al. |
| 5,032,708 A | 7/1991 | Comerford et al. |
| 5,037,099 A | 8/1991 | Burtch |
| 5,046,737 A | 9/1991 | Fienberg |
| 5,074,566 A | 12/1991 | Desbiens |
| 5,083,815 A | 1/1992 | Scrymgeour et al. |
| 5,092,598 A | 3/1992 | Kamille |
| 5,094,458 A | 3/1992 | Kamille |
| 5,100,139 A | 3/1992 | Di Bella |
| 5,109,153 A | 4/1992 | Johnson et al. |
| 5,112,050 A | 5/1992 | Koza et al. |
| 5,116,049 A | 5/1992 | Sludikoff et al. |
| 5,118,109 A | 6/1992 | Gumina |
| 5,119,295 A | 6/1992 | Kapur |
| 5,158,293 A | 10/1992 | Mullins |
| 5,165,967 A | 11/1992 | Theno et al. |
| 5,186,463 A | 2/1993 | Marin et al. |
| 5,189,292 A | 2/1993 | Batterman et al. |
| 5,193,815 A | 3/1993 | Pollard |
| 5,193,854 A | 3/1993 | Borowski, Jr. et al. |
| 5,228,692 A | 7/1993 | Carrick et al. |
| 5,232,221 A | 8/1993 | Sludikoff et al. |
| 5,234,798 A | 8/1993 | Heninger et al. |
| 5,249,801 A | 10/1993 | Jarvis |
| 5,259,616 A | 11/1993 | Bergmann |
| 5,273,281 A | 12/1993 | Lovell |
| 5,276,980 A | 1/1994 | Carter et al. |
| 5,282,620 A | 2/1994 | Keesee |
| 5,308,992 A | 5/1994 | Crane et al. |
| 5,317,135 A | 5/1994 | Finocchio |
| 5,326,104 A | 7/1994 | Pease et al. |
| 5,332,219 A | 7/1994 | Marnell, II et al. |
| 5,342,047 A | 8/1994 | Hiedel et al. |
| 5,342,049 A | 8/1994 | Wichinsky et al. |
| 5,344,144 A | 9/1994 | Canon |
| 5,346,258 A | 9/1994 | Behm et al. |
| 5,380,007 A | 1/1995 | Travis et al. |
| 5,393,057 A | 2/1995 | Marnell, II et al. |
| 5,401,024 A | 3/1995 | Simunek |
| 5,401,541 A | 3/1995 | Hodnett, III |
| 5,403,039 A | 4/1995 | Borowski, Jr. et al. |
| 5,407,199 A | 4/1995 | Gumina |
| 5,420,406 A | 5/1995 | Izawa et al. |
| 5,432,005 A | 7/1995 | Tanigami et al. |
| 5,451,052 A | 9/1995 | Behm et al. |
| 5,456,465 A | 10/1995 | Durham |
| 5,456,602 A | 10/1995 | Sakuma |
| 5,471,039 A | 11/1995 | Irwin, Jr. et al. |
| 5,471,040 A | 11/1995 | May |
| 5,475,205 A | 12/1995 | Behm et al. |
| 5,486,005 A | 1/1996 | Neal |
| 5,499,816 A | 3/1996 | Levy |
| 5,513,846 A | 5/1996 | Niederlein et al. |
| 5,528,154 A | 6/1996 | Leichner et al. |
| 5,536,016 A | 7/1996 | Thompson |
| 5,540,442 A | 7/1996 | Orselli et al. |
| 5,548,110 A | 8/1996 | Storch et al. |
| 5,550,746 A | 8/1996 | Jacobs |
| 5,560,610 A | 10/1996 | Behm et al. |
| 5,564,700 A | 10/1996 | Celona |
| 5,564,977 A | 10/1996 | Algie |
| 5,588,069 A | 12/1996 | Katayama et al. |
| 5,591,956 A | 1/1997 | Longacre, Jr. et al. |
| 5,599,046 A | 2/1997 | Behm et al. |
| 5,602,381 A | 2/1997 | Hoshino et al. |
| 5,621,200 A | 4/1997 | Irwin et al. |
| 5,628,684 A | 5/1997 | Bouedec |
| 5,630,753 A | 5/1997 | Fuchs |
| 5,651,735 A | 7/1997 | Baba |
| 5,655,961 A | 8/1997 | Acres et al. |
| 5,667,250 A | 9/1997 | Behm et al. |
| 5,682,819 A | 11/1997 | Beatty |
| 5,690,366 A | 11/1997 | Luciano |
| 5,704,647 A | 1/1998 | Desbiens |
| 5,722,891 A | 3/1998 | Inoue |
| 5,726,898 A | 3/1998 | Jacobs |
| 5,732,948 A | 3/1998 | Yoseloff |
| 5,741,183 A | 4/1998 | Acres et al. |
| 5,743,800 A | 4/1998 | Huard et al. |
| 5,752,882 A | 5/1998 | Acres et al. |
| 5,756,220 A | 5/1998 | Hoshino et al. |
| 5,768,142 A | 6/1998 | Jacobs |
| 5,769,458 A | 6/1998 | Carides et al. |
| 5,770,533 A | 6/1998 | Franchi |
| 5,772,509 A | 6/1998 | Weiss |
| 5,772,510 A | 6/1998 | Roberts |
| 5,772,511 A | 6/1998 | Smeltzer |
| RE35,864 E | 7/1998 | Weingardt |
| 5,779,840 A | 7/1998 | Boris |
| 5,789,459 A | 8/1998 | Inagaki et al. |
| 5,791,990 A | 8/1998 | Schroeder et al. |
| 5,797,794 A | 8/1998 | Angell |
| 5,803,504 A | 9/1998 | Deshiens et al. |
| 5,816,920 A | 10/1998 | Hanai |
| 5,818,019 A | 10/1998 | Irwin, Jr. et al. |
| 5,820,459 A | 10/1998 | Acres et al. |
| 5,823,874 A | 10/1998 | Adams |
| 5,830,063 A | 11/1998 | Byrne |

| | | |
|---|---|---|
| 5,830,066 A | 11/1998 | Goden et al. |
| 5,830,067 A | 11/1998 | Graves et al. |
| 5,833,537 A | 11/1998 | Barrie |
| 5,835,576 A | 11/1998 | Katz et al. |
| 5,836,086 A | 11/1998 | Elder |
| 5,836,817 A | 11/1998 | Acres et al. |
| 5,848,932 A | 12/1998 | Adams |
| 5,863,075 A | 1/1999 | Rich et al. |
| 5,871,398 A | 2/1999 | Schneier et al. |
| 5,876,284 A | 3/1999 | Acres et al. |
| 5,882,261 A | 3/1999 | Adams |
| 5,883,537 A | 3/1999 | Luoni et al. |
| 5,885,158 A | 3/1999 | Torango et al. |
| 5,887,906 A | 3/1999 | Sultan |
| 5,903,340 A | 5/1999 | Lawady et al. |
| 5,911,418 A | 6/1999 | Adams |
| 5,915,588 A | 6/1999 | Stoken et al. |
| 5,934,671 A | 8/1999 | Harrison |
| 5,970,143 A | 10/1999 | Schneier et al. |
| 5,979,894 A | 11/1999 | Alexoff |
| 5,996,997 A | 12/1999 | Kamille |
| 5,997,044 A | 12/1999 | Behm et al. |
| 6,003,307 A | 12/1999 | Naber et al. |
| 6,004,207 A | 12/1999 | Wilson, Jr. et al. |
| 6,004,208 A | 12/1999 | Takemoto et al. |
| 6,007,162 A | 12/1999 | Hinz et al. |
| 6,012,982 A | 1/2000 | Piechowiak et al. |
| 6,014,032 A | 1/2000 | Maddix et al. |
| 6,017,032 A | 1/2000 | Grippo et al. |
| 6,024,641 A | 2/2000 | Sarno |
| 6,053,405 A | 4/2000 | Irwin, Jr. et al. |
| 6,077,162 A | 6/2000 | Weiss |
| 6,080,062 A | 6/2000 | Olson |
| 6,086,477 A | 7/2000 | Walker et al. |
| 6,089,978 A | 7/2000 | Adams |
| 6,099,407 A | 8/2000 | Parker, Jr. et al. |
| 6,102,400 A | 8/2000 | Scott et al. |
| 6,107,913 A | 8/2000 | Gatto et al. |
| 6,119,364 A | 9/2000 | Elder |
| 6,125,368 A | 9/2000 | Bridge et al. |
| 6,142,872 A | 11/2000 | Walker et al. |
| 6,146,272 A | 11/2000 | Walker et al. |
| 6,149,521 A | 11/2000 | Sanduski |
| 6,155,491 A | 12/2000 | Dueker et al. |
| 6,168,521 B1 | 1/2001 | Luciano et al. |
| 6,168,522 B1 | 1/2001 | Walker et al. |
| 6,179,710 B1 | 1/2001 | Sawyer et al. |
| 6,203,430 B1 | 3/2001 | Walker et al. |
| 6,206,373 B1 | 3/2001 | Garrod |
| 6,210,275 B1 | 4/2001 | Olsen |
| 6,217,448 B1 | 4/2001 | Olsen |
| 6,220,961 B1 | 4/2001 | Keane et al. |
| 6,224,055 B1 | 5/2001 | Walker et al. |
| 6,227,969 B1 | 5/2001 | Yoseloff |
| 6,238,288 B1 | 5/2001 | Walker et al. |
| 6,309,300 B1 | 10/2001 | Glavich |
| 6,312,334 B1 | 11/2001 | Yoseloff |
| 6,315,291 B1 | 11/2001 | Moody |
| 6,330,976 B1 | 12/2001 | Dymetman et al. |
| 6,331,143 B1 | 12/2001 | Yoseloff |
| 6,334,814 B1 | 1/2002 | Adams |
| 6,340,158 B2 | 1/2002 | Pierce et al. |
| 6,368,213 B1 | 4/2002 | McNabola |
| 6,375,568 B1 | 4/2002 | Roffman et al. |
| 6,379,742 B1 | 4/2002 | Behm et al. |
| 6,394,899 B1 | 5/2002 | Walker et al. |
| 6,398,214 B1 | 6/2002 | Moteki et al. |
| 6,398,643 B1 | 6/2002 | Knowles et al. |
| 6,398,644 B1 | 6/2002 | Perrie et al. |
| 6,398,645 B1 | 6/2002 | Yoseloff |
| 6,416,408 B2 | 7/2002 | Tracy et al. |
| 6,419,579 B1 | 7/2002 | Bennett |
| 6,435,408 B1 | 8/2002 | Irwin, Jr. et al. |
| 6,435,500 B2 | 8/2002 | Gumina |
| 6,478,677 B1 | 11/2002 | Moody |
| 6,491,215 B1 | 12/2002 | Irwin, Jr. et al. |
| 6,497,408 B1 | 12/2002 | Walker et al. |
| 6,533,182 B1 | 3/2003 | Ohshima et al. |
| 6,533,274 B1 | 3/2003 | Heggerty |
| 6,552,290 B1 | 4/2003 | Lawandy |
| 6,588,747 B1 | 7/2003 | Seelig |
| 6,599,186 B1 | 7/2003 | Walker et al. |
| 6,601,772 B1 | 8/2003 | Rubin et al. |
| 6,637,747 B1 | 10/2003 | Garrod |
| 6,648,735 B2 | 11/2003 | Miyashita et al. |
| 6,648,753 B1 | 11/2003 | Tracy et al. |
| 6,648,755 B1 | 11/2003 | Luciano et al. |
| 6,676,126 B1 | 1/2004 | Walker et al. |
| 6,692,354 B2 | 2/2004 | Tracy et al. |
| 6,702,047 B2 | 3/2004 | Huber |
| 6,773,345 B2 | 8/2004 | Walker et al. |
| 6,776,337 B2 | 8/2004 | Irwin, Jr. et al. |
| 6,786,824 B2 | 9/2004 | Cannon |
| 6,823,874 B2 | 11/2004 | Lexcen |
| 6,875,105 B1 | 4/2005 | Behm et al. |
| 6,898,288 B2 | 5/2005 | Chui |
| 6,929,186 B2 | 8/2005 | Lapstun |
| 2001/0027130 A1 | 10/2001 | Namba et al. |
| 2001/0030978 A1 | 10/2001 | Holloway et al. |
| 2001/0034262 A1 | 10/2001 | Banyai |
| 2001/0040345 A1 | 11/2001 | Au-Yeung |
| 2002/0022511 A1 | 2/2002 | Eklund et al. |
| 2002/0084327 A1 | 7/2002 | Ehrhart et al. |
| 2002/0084335 A1 | 7/2002 | Ericson |
| 2002/0136459 A1 | 9/2002 | Imagawa et al. |
| 2002/0150276 A1 | 10/2002 | Chang |
| 2002/0171201 A1 | 11/2002 | Au-Yeung |
| 2002/0187825 A1 | 12/2002 | Tracy et al. |
| 2003/0050109 A1 | 3/2003 | Caro et al. |
| 2003/0114210 A1 | 6/2003 | Meyer et al. |
| 2004/0026508 A1 | 2/2004 | Nakajima et al. |
| 2004/0076310 A1 | 4/2004 | Hersch et al. |
| 2004/0124243 A1 | 7/2004 | Gatto et al. |
| 2004/0127279 A1 | 7/2004 | Gatto et al. |
| 2004/0153649 A1 | 8/2004 | Rhoads et al. |
| 2004/0173965 A1 | 9/2004 | Stanek |
| 2004/0178582 A1 | 9/2004 | Garrod |
| 2004/0185931 A1 | 9/2004 | Hartman et al. |
| 2004/0204222 A1 | 10/2004 | Roberts |
| 2004/0259631 A1 | 12/2004 | Katz et al. |
| 2004/0266514 A1 | 12/2004 | Penrice |
| 2005/0173533 A1 | 8/2005 | Pettersson |
| 2006/0249898 A1 | 11/2006 | LaPorte et al. |

FOREIGN PATENT DOCUMENTS

| | | |
|---|---|---|
| AU | B-21070/92 | 7/1993 |
| AU | A-50327/96 | 2/1997 |
| AU | B-52499/96 | 2/1997 |
| AU | 199716432 | 9/1997 |
| AU | A-45403/97 | 4/1998 |
| AU | A-63553/98 | 10/1998 |
| DE | 2938307 | 4/1981 |
| DE | 3035898 | 4/1982 |
| DE | 3035947 | 5/1982 |
| DE | 2938307 | 6/1982 |
| DE | 29803107 | 8/1988 |
| DE | 3822636 | 1/1990 |
| DE | 2938307 | 8/1990 |
| DE | 3822636 | 1/1992 |
| DE | 3415114 | 10/1995 |
| DE | 19646956 | 5/1998 |
| DE | 19706286 | 5/1998 |
| DE | 29816453 | 4/1999 |
| DE | 19751746 | 5/1999 |
| EP | 0122902 | 4/1984 |
| EP | 0333934 | 9/1989 |
| EP | 0458623 | 11/1991 |
| EP | 0798676 | 10/1997 |
| EP | 0799649 | 10/1997 |
| EP | 0149712 | 7/1998 |
| EP | 0874337 | 10/1998 |
| EP | 0896304 | 2/1999 |
| EP | 0914875 | 5/1999 |
| EP | 0919965 | 6/1999 |
| EP | 0983801 | 3/2000 |
| EP | 0983801 | 3/2001 |
| EP | 1149712 | 10/2001 |
| ES | 2006400 | 4/1989 |

| | | |
|---|---|---|
| ES | 2006401 | 4/1989 |
| GB | 642892 | 9/1950 |
| GB | 2075918 | 11/1981 |
| GB | 2222712 | 3/1990 |
| GB | 2230373 | 10/1990 |
| GB | 2295775 | 12/1996 |
| GB | 3328311 | 2/1999 |
| GB | 23282311 | 2/1999 |
| JP | 529535 | 6/1983 |
| JP | 529536 | 6/1983 |
| JP | 02235744 | 9/1990 |
| JP | 04132672 | 5/1992 |
| WO | WO85/02250 | 5/1985 |
| WO | WO91/17529 | 11/1991 |
| WO | WO 98/03910 | 1/1998 |
| WO | WO 98/40138 | 9/1998 |
| WO | WO 99/09364 | 2/1999 |
| WO | WO 99/17486 | 4/1999 |
| WO | WO 99/26204 | 5/1999 |
| WO | WO 99/39312 | 8/1999 |
| WO | WO00/00256 | 1/2000 |
| WO | WO00/78418 | 12/2000 |
| WO | WO01/74460 | 11/2001 |
| WO | WO01/93966 | 12/2001 |
| WO | WO02/056266 | 7/2002 |

OTHER PUBLICATIONS

John C. Hallyburton, Jr., 'Frequently Asked Questions About Keno' (Internet Article), 1995, 1998, 10 Pgs., (http://conielco.com/faq/keno.html).

Judith Gaines, 'Pool Party Betting Business Booming Throughout Area Workplaces', (Internet Article), Mar. 19, 1994, 2 Pgs., Issue 07431791, Boston Globe, Boston, MA.

'Notice of Final Rulemaking', (Internet Article), Mar. 24, 2000, 10 Pgs., vol. 6, Issue #13, Arizona Administrative Register, Arizona.

'How to Play Megabucks', (Internet Article), May 8, 2001, 2 Pgs., Oregon Lottery Megabucks, (http://www.oregonlottery.org/mega/m.sub.-howto.htm).

'Oregon Lottery', (Internet Article), Apr. 30, 2004, 9 Pgs., Oregon Lottery Web Center, (http://www.oregonlottery.org/general/g.sub.-hist.shtml).

'Powerball Odd & Prizes', 'How to Play Powerball', (Internet Artiele),Dec. 2002, 2 Pgs., (www.powerball.com/pbhowtoplay.shtm).

Mike Parker, 'The History of Horse Racing'(Internet Article),1996, 1997,1998, 5 Pgs., http://ww.mrmike.com/explore/hrhist.com.

EPO Search Report, May 15, 2009.

EPO Search Report, Jun. 4, 2009.

EMBEDDED OPTICAL SIGNATURES IN DOCUMENTS

CROSS-REFERENCE TO RELATED APPLICATIONS

The present application is a continuation of U.S. patent application Ser. No. 11/391,746, filed Mar. 29, 2006, which is a continuation-in-part of U.S. patent application Ser. No. 11/288,629, filed Nov. 29, 2005, now U.S. Pat. No. 7,364,091, granted Apr. 29, 2008, which is a continuation-in-part of U.S. patent application Ser. No. 11/014,159, filed Dec. 16, 2004, now U.S. Pat. No. 7,252,222, granted Aug. 7, 2007, which claims the benefit of U.S. Provisional Patent Application Ser. No. 60/531,179, entitled "Embedded Optical Signatures," filed on Dec. 19, 2003, the entirety of all of which are hereby incorporated herein by this reference.

BACKGROUND OF THE INVENTION

1. Field of the Invention

The present invention generally relates to systems and methods of document validation and authentication. More particularly, the present invention relates to the use of embedded optical signatures in documents primarily for the purposes of authentication, validation, and copy verification.

2. Description of the Related Art

There are several methods known to embed security measures into a document to help prove that the document is authentic. The most basic methods are to impose or emboss a visible seal on the document. It is also known to use a watermark or a ribbon in the substrate of the document, or use color shifting ink, all of which are readily visible to a person viewing the document. There are other methods to maintain document authenticity which are not readily visible to a viewer, such as micro printing, or the use of heat (or light) sensitive ink.

One particularly important area for document authentication concerns lottery tickets. In most instances, mere possession of a winning lottery ticket entitles the holder to the winnings. Thus, authentication of the presented lottery ticket is critically important. For example, lottery on-line tickets which are common in many countries and states are, by necessity, printed and presented to the purchaser in real-time with transactional data printed on the lottery ticket via a thermal or impact printer. To enhance security, lotteries typically use preprinted ticket stock with serial numbering on the back of the printing substrate as well as fluorescent and other inks on the ticket substrate to help prove authenticity and integrity. The preprinted serial numbering provides much of the security in determining the authenticity of a winning ticket because the distribution of the preprinted serial number ticket stock is maintained by an entity separate from the one controlling the printing of transactional data. When a winning ticket is presented for redemption, an audit trail can be established between the ticket stock serial number and the transactional data. However, this added paper stock security has the disadvantage of high cost, as well as the logistics of tracking the ticket stock. Also, the labor intensive nature of correlating the ticket stock to an on-line lottery ticket printed at a given retailer at a given time typically prohibits the method's use for all but high-tier winning tickets. Moreover, existing commercial barcodes and serial numbers only cover a portion of the ticket and are relatively easy to remove and replace.

Another problem is that it is essential for an on-line lottery ticket to be proven both to exhibit authenticity (i.e., proof that it was created by the lottery system at the appropriate time) and integrity (i.e., that the ticket has not been modified by the player—it is in its original unmodified condition). Preprinted ticket stock and associated commercial barcodes simply prove that a ticket was printed at a given retailer during a given time period. Also, mere proof of authenticity does not address the problem of an insider with immediate knowledge of the winning ticket's number simply acquiring ticket stock from the retailer and printing a fraudulent winning ticket indicia. The concept of authenticity is also important to the lottery customer as he is also protected from the lottery authority falsely denying that the ticket is authentic.

Document authentication and integrity are particularly difficult with lottery "scratch-off" tickets. The scratch-off ticket has an array of playing indicia covered with a removable covering, typically a layer of latex, and the player removes the scratch-off layer to determine if the ticket contains winning indicia. The system to validate the winning scratch-off ticket must determine if the scratch-off media has been substantially removed prior to awarding a prize. This step is necessary to ensure that the scratch-off ticket cannot be pre-screened by the ticket retailers with only non-winning tickets sold to the general public; i.e., a ticket with a substantial amount of its scratch-off layer removed cannot be sold as a virgin (un-played) ticket. Traditionally, this validation of removal of scratch-off layer was accomplished by requiring the retailer to enter coded information that was hidden under the scratch-off layer. However, this process was labor intensive and time consuming for the retailer. Often, the player does not remove the portion of the scratch-off layer covering the coded information as the revealing of the coded information is not of any value to the player. Furthermore, sometimes the area over the coded information is marked e.g., "VOID IF REMOVED", to prevent the player from scratching off the layer and attempting to alter the code.

One method that attempted to allow authentication, integrity, and validation of scratch-off lottery tickets entailed hiding a two-dimensional barcode under the ticket's scratch-off medium that could easily be scanned with the proper equipment. However, the equipment required to scan the two dimensional bar code is expensive. Moreover, the hiding of a two-dimensional barcode under the ticket's scratch-off medium still results in the same labor intensive problem for the retailer as players tend to not scratch-off the area of the latex covering the two-dimensional barcode because it is of no interest. A further method to insure authentication, integrity, and validation of scratch-off lottery tickets is electrically scanning the ticket for the presence of electrical signatures in the scratch-off ink as well as the ticket's substrate. However, this method also requires expensive equipment.

When on-line systems for validating lottery tickets are employed, a scratch-off ticket presented for validation has its serial numbered barcode scanned and transmitted, along with other data, to a common Central Site database. If the serial number and other data identify the ticket as a winner and it has not been previously paid, a "pay ticket" authorization is transmitted to the terminal that generated the request.

When dial-up validation systems are employed, the dial-up terminal typically decrypts the information embedded in the scratch-off ticket's barcode to determine if it won a prize and, if so, authorizes payment locally without immediately contacting a Central Site database. Scanned ticket information is then queued in the terminal's buffer and transmitted to a Central Site database periodically—e.g., once or twice a day.

Recent advances in color printers and photocopies have made it relatively easy to produce authentic looking forgeries of scratch-off lottery tickets with their scratch-off coating completely removed. These forgeries can then be presented for payment to unsuspecting retailers. In the case of on-line validation systems, the forgery is first presented to a retailer. On-line systems derive their security by insuring that the ticket was not previously paid. So, the forged ticket's barcode is authenticated and the winnings are paid. After the forgery has been paid and the forged ticket destroyed, the authentic ticket is then presented for payment at a different retailer. The system will not authorize payment of this ticket, because the Central Site database will indicate that it was already paid. However, since this second ticket is truly authentic, it can then be submitted for payment to the Lottery without any fear of detection of the prior forgery. Thus, with on-line systems, the forger can redeem a scratch-off lottery ticket twice with minimal fear of detection.

With a dial-up validation system, the problem becomes worse. Since the terminal does not immediately transmit the validation data to the Central Site, multiple forged tickets can be presented to different terminals at different retailers. As long as the involved terminals have not contacted the Central Site database, the same winning ticket can be paid multiple times.

It is therefore desirable to incorporate an automated validation methodology that would, in addition to simply scanning a scratch-off ticket's barcode, also verify that the ticket presented for validation is, in fact, authentic. Such a validation can be performed by reading electrical signatures embedded in genuine scratch-off lottery tickets that are not present in color forgeries. However, this technique requires relatively expensive and specialized validation equipment.

Accordingly, it would be advantageous to provide a method for document validation embedded on the substrate of the document that is visible to equipment viewing the document. Said method should not require a large surface area of view in order to provide the information requisite to validate or authenticate the document. Said method should also not require expensive validation equipment. Such method would be particularly well suited for the validation of scratch-off lottery tickets as well as authenticating on-line tickets. It is toward such a method of document security and authentication that the present invention is primarily directed.

SUMMARY OF THE INVENTION

Briefly described, the present invention consists of a method which embeds an optical signature in a document as either an identifying signature or as steganographic data. In one embodiment, the method includes the steps of embedding a first visible optical pattern on the substrate, and then placing an invisible covering over at least a portion of the first optical pattern. The invisible covering either reflects light in one or more non-visible wavelengths or fluoresces when exposed to a particular wavelength of light. In another embodiment, the method of embedding an optical signature on a substrate, includes the steps of embedding a first invisible optical pattern on the substrate, with the invisible first optical pattern reflecting light in one or more non-visible wavelengths or fluorescing when exposed to a particular wavelength of light, and then embedding a second visible optical pattern over at least a portion of the first invisible optical pattern.

The optical signature is an optical pattern that is generated from and represents a known mathematical value embodied as printed geometric relationships on the documents, and the same mathematical value can be generated from examination of the embedded optical pattern on the document. Other data, such as cryptographic keys, may be required to generate the same mathematical value after examining the embedded pattern. The document can thus be validated, authenticated, or the determination of a valid copy of an original document with the embedded optical signature made through comparison of the known mathematical value and the mathematical value generated from the optical pattern on the document. The optical pattern can also be generated from other identification codes on the document, e.g., Universal Product Codes (UPC) or other bar codes, as could be present on lottery tickets. Moreover, the optical pattern can, in itself, carry extensive data which is not necessarily related to or cannot be created from other sources of data already on the ticket.

The invention therefore provides an industrial advantage in that it is a method for document validation embedded on the substrate of the document that is visible to equipment, and does not necessarily have to be visible to a person, which can be used to verify the authenticity of a printed document, such as a lottery ticket. The present method does not require a large surface area of view in order to provide the information requisite to validate or authenticate the document, making it particularly useful as a validating pattern under the scratch-off layer of scratch-off lottery tickets. In addition to scratch-off lottery tickets, the present invention can be used to ensure the authenticity of a document, or a true copy of the original document.

Other objects, features, and advantages of the present invention will become apparent after review of the hereinafter set forth Brief Description of the Drawings, Detailed Description of the Invention, and the Claims.

DETAILED DESCRIPTION OF THE INVENTION

Figure 1:
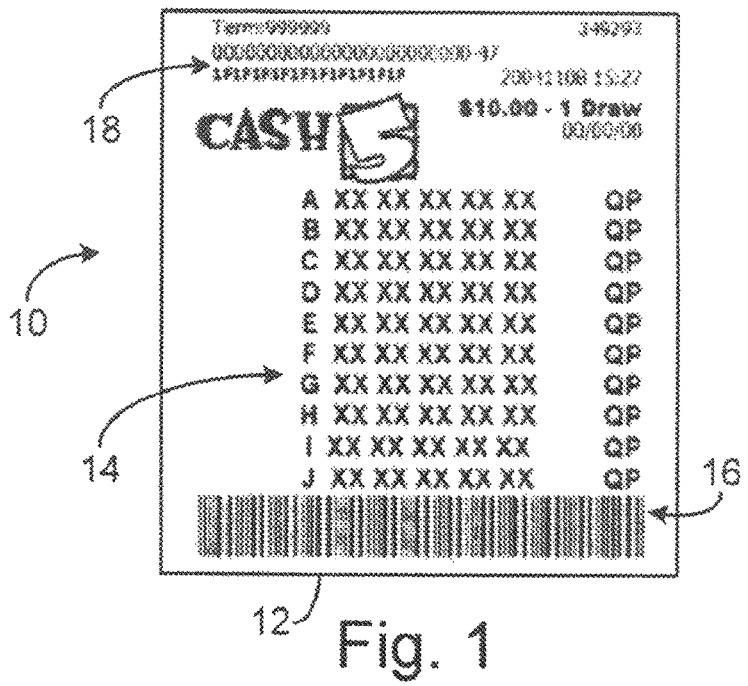
FIG. 1 is an exemplary printed on-line lottery ticket.

The present invention provides a method of embedding an optical signature into a document requiring authentication or verification, e.g., the scratch-off lottery ticket 10 in FIG. 1. In essence, a detectable optical pattern is embedded on the substrate of the document. In one embodiment, the optical pattern encodes a mathematical value that can be reliably reproduced upon proper observation. The optical signature can be embedded over a large area of the document and viewing only a small portion of the pattern can provide enough of the signature to allow validation. The optical signature is designed so that it does not interfere with the actual image on the document and can reside in the background in a steganographic manner.

In another embodiment in which lottery tickets are vended through remote sales, and thus "on-line", a reduced-labor alternative method of validation comprises storing a virtual ticket serial number in the vending terminal's memory (not shown). The virtual ticket serial number can be based upon a pseudorandom starting value that was passed, encrypted, to the Lottery terminal at the start of the day. Whenever an on-line lottery ticket is issued, the virtual ticket serial number is incremented either by a unit or pseudo randomly via a Linear Congruential Generator (LCG). These LCG s use a method similar to folding schemes in chaotic maps. For reference, the general formula is:

$$I_k = (aI_k - 1 + c) \bmod m$$

The values a, c and m are pre-selected constants: a is known as the multiplier, c is the increment, and m is the modulus. The resulting virtual ticket number would then be used to generate an optical signature pattern that would be printed, real-time, in the background of the on-line lottery ticket. To the player or retailer, this optical signature would appear to be gray shading. However, when a winning ticket is presented for optical scanning of its barcode, an optical scanner can detect the optical signature in addition to the barcode and automatically correlate the two.

Another use of the present invention is copyright protection or proof of copying of images. If an optical signature is embedded in the background of an image, any illegal copies of the image would contain the optical signature as well as the image. A sufficiently large number of pseudorandom optical patterns are possible in the same document and the optical signature can be embedded in images in a manner not detectable by a human observer. Therefore, it would be very difficult to remove the optical signatures from the optically-signed original document.

An exemplary printed on-line lottery ticket 10 is shown in FIG. 1. As can be seen, on-line lottery tickets tend to print data in groups of information such as the player selected numbers 14 printed on a substrate 12. The ticket 10 can also contain a bar code 16 or other serial number 18 to provide security.

It should be noted that while the disclosed embodiments of the optical signature can be encoded from a random mathematical value, other identification codes embedded on the substrate, such as UPC codes on Lottery tickets, can be used to generate the optical signature or used in validation of the document. Thus, the optical pattern can then be encoded from a mathematical value based upon only or partially upon the identification code. Furthermore, the optical pattern can be readily visible to a viewer thereof, or can be invisible to a viewer, such as printed in ink only viewable when exposed to a certain wavelength of light, such as ultraviolet light.

As can be seen in FIGS. 2A-3B, the present invention is particularly advantageous in use under the scratch-off layer 24 of a scratch-off lottery ticket 20. This method allows any area removed by the player to be subjected to embedded optical signature validation. And for added security, the optical signature validation data can then be compared to the lottery ticket's barcode data (typically printed on the back of a scratch-off lottery ticket) allowing the lottery ticket 20 to be validated without any added scratch-off medium removal. Furthermore, the scanning equipment required for optical signature validation is inexpensive, requiring, in this embodiment, a Video Graphics Array (VGA) scanner with optical capabilities of 16 colors at 640×480 pixel resolution.

A less expensive alternative is to exploit the recent reduction in the cost of digital cameras to employ an "area" optical technique for scratch-off lottery ticket authentication. This methodology exploits optical characteristics of scratch-off lottery tickets 20 that are not present in simple color reproductions. Non-visible optical portions of the electromagnetic spectrum that are not reproduced by color copying/printing equipment, such as infrared and ultraviolet wavelengths are printed on the original document.

It is well known that the infrared and ultraviolet portions of the electromagnetic spectrum are not visibly detectable by the human eye and consequently are typically not processed by color copying/printing/scanning equipment. Thus, if the infrared or ultraviolet spectrums are used to reveal characteristics or signatures unique to scratch-off lottery tickets, an automated scanning process could theoretically be applied to authenticate actual tickets from forgeries.

Both Charged Coupled Device (CCD) and Complimentary Metal Oxide Semiconductor (CMOS) based cameras tend to be hypersensitive in the infrared range of the electromagnetic spectrum. So much so, in fact, that these types of inexpensive cameras typically are equipped with blocking infrared filters to reduce the device's tendency to over compensate light reflections in this range. By simply removing the infrared filter from a CCD or CMOS camera, the device records both visible and infrared light reflections.

Figure 2A:
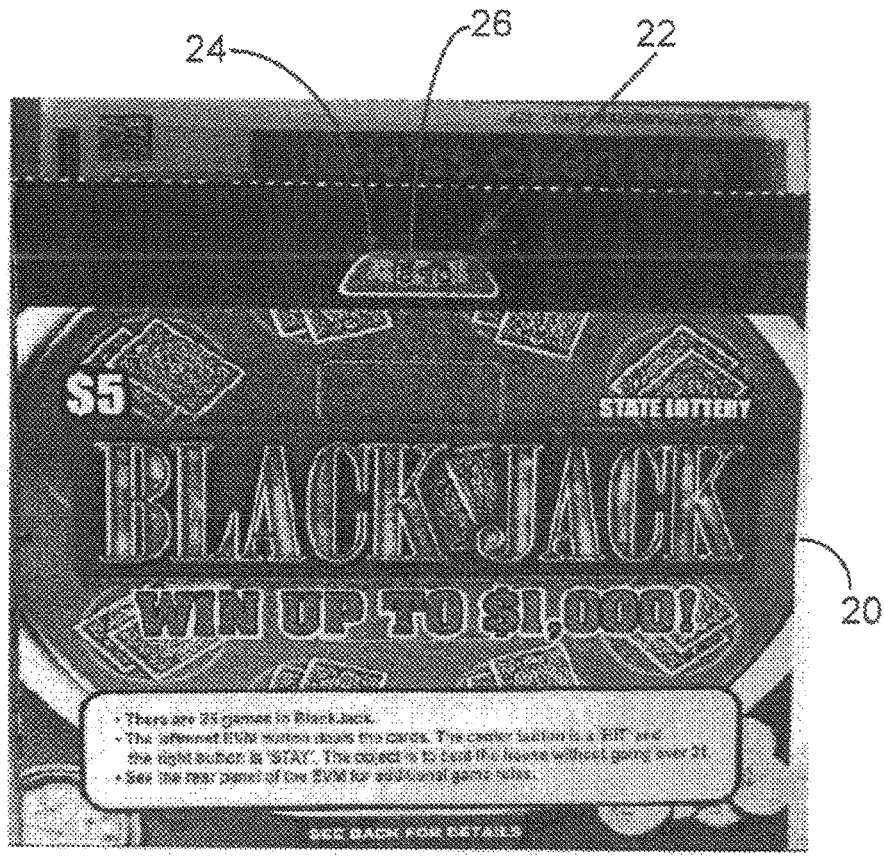
FIG. 2A is one embodiment of a scratch-off lottery ticket with a portion of the scratch-off covering removed to reveal a code.
Figure 2B:
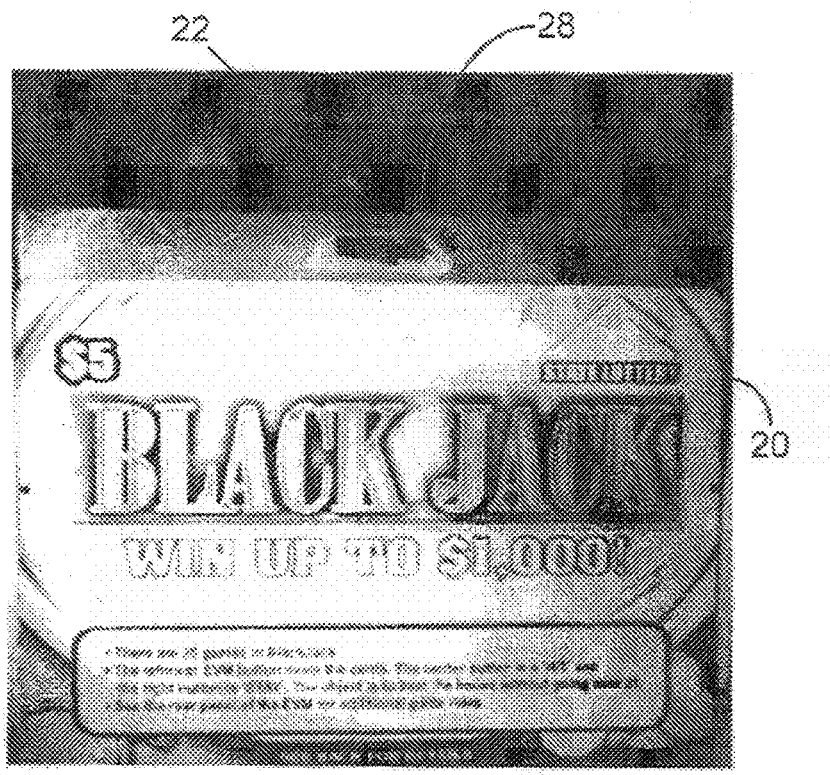
FIG. 2B is the scratch-off lottery ticket of FIG. 2A illuminated under infrared light.

When infrared light sources are coupled with this enhanced sensitivity to infrared reflections, characteristics unique to scratch-off lottery ticket printing processes become apparent. For example, FIG. 2A provides an illustration of an actual scratch-off lottery ticket 20 illuminated under normal light, with a code 26 revealed from the removal of the scratch-off layer 24 on a specific portion 22 thereof. The code 26 is embedded on a layer of infrared reflective pigments not readily visible under normal (white) light. FIG. 2B shows the lottery ticket 20 illuminated under infrared light and the code 26 cannot be seen due to the reflectivity of the pigment layer.

Figure 3A:
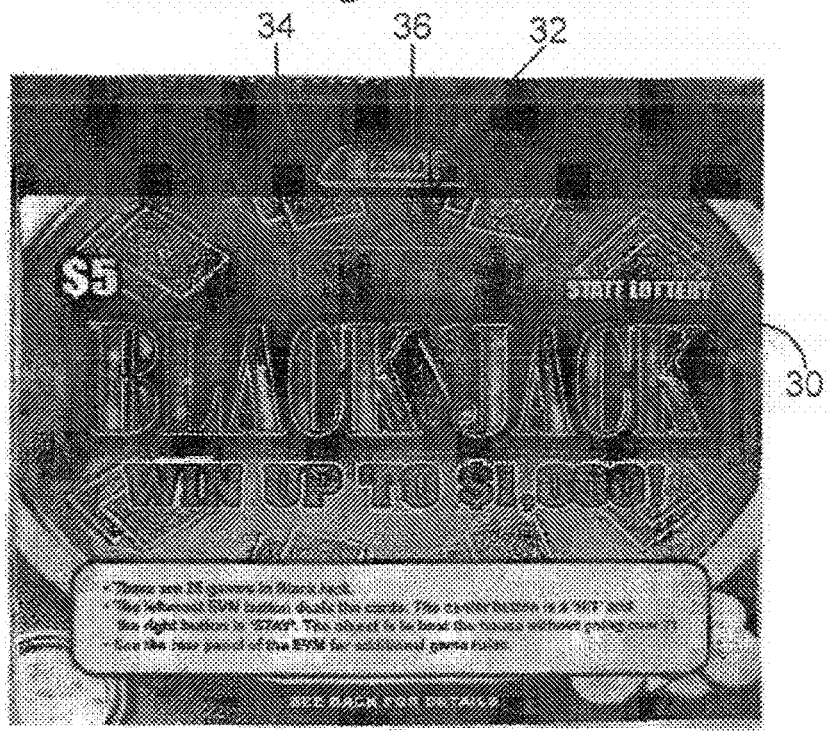
FIG. 3A is a photocopy of the scratch-off lottery ticket of FIG. 2A
Figure 3B:
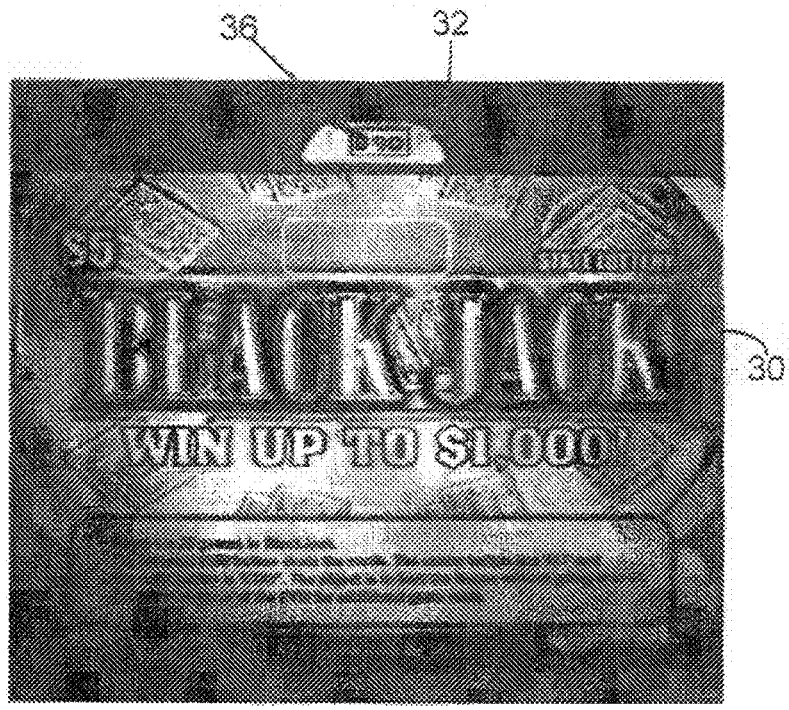
FIG. 3B is the photocopy of the scratch-off lottery ticket of FIG. 3A illuminated under infrared light.

FIG. 3A illustrates a color photocopy 30 of the same lottery ticket 20 of FIG. 2A under identical lighting conditions. With the code 36 revealed under the scratch-off layer 34 at the code portion 32. However, because the infrared reflective pigments are not present, the infrared illumination of the lottery ticket photocopy 30, shown in FIG. 3B, will clearly reveal the code 36 in the captured image Thus, an automated validator can be configured with two sets of illumination lights, one set generating white light with the other generating infrared light. Through the method of this embodiment, when a ticket is first presented, the validator illuminates the ticket with white light and captures a digital image using this illumination. This image is then processed to identify key indicia that were revealed under the scratch-off coating. A second digital image is then taken and processed using only infrared illumination Assuming the key indicia was identified in the first image and not identified in the second (infrared) image, the ticket would be assumed to be authentic. However, if the key indicia were identified in both the first and second images, the lottery ticket would be assumed to be a photocopy.

It should be noted that, in many cases, the above technique would not add any cost to the lottery ticket itself, since some existing printing processes already use inks that reflect both visible and invisible light. For scratch-off lottery tickets, an area such as portion 22 in FIGS. 2A-2B, can be reserved that has a lower layer covered by scratch-off primer and mask coatings. On this reserved area, a barcode or machine detectable pattern can be printed and embedded, selectively using inventory information or a unique identification code if desired. Once printed, this area would utilize the same technique of white/infrared or ultraviolet light illumination described above to determine if the ticket was authentic or a photocopy.

An alternate embodiment is to simply add infrared reflective pigments to lottery ticket display areas. In other words, special pigments could be added to a lottery ticket's display area that are invisible under normal light, but become highly reflective under infrared illumination. Since photocopies would not have these special infrared reflective pigments, the original would appear substantially darker than the copy when viewed under infrared illumination. With this technique, the validator would also be configured with two sets of illumination lights, one set generating white light with the other generating infrared light. When a ticket is first presented, the validator illuminates the ticket with white light and captures a digital image. The validator would then automatically turn off its white and actuate its infrared illumination. A second digital image would then be taken with just the infrared illumination. Assuming this second image produced sufficient reflections above an a priori threshold that was not apparent under the white light exposure the ticket would be deemed authentic. However, if sufficient reflections were not detected in the second (infrared) scan, the ticket would be assumed to be a photocopy.

Figure 4A:
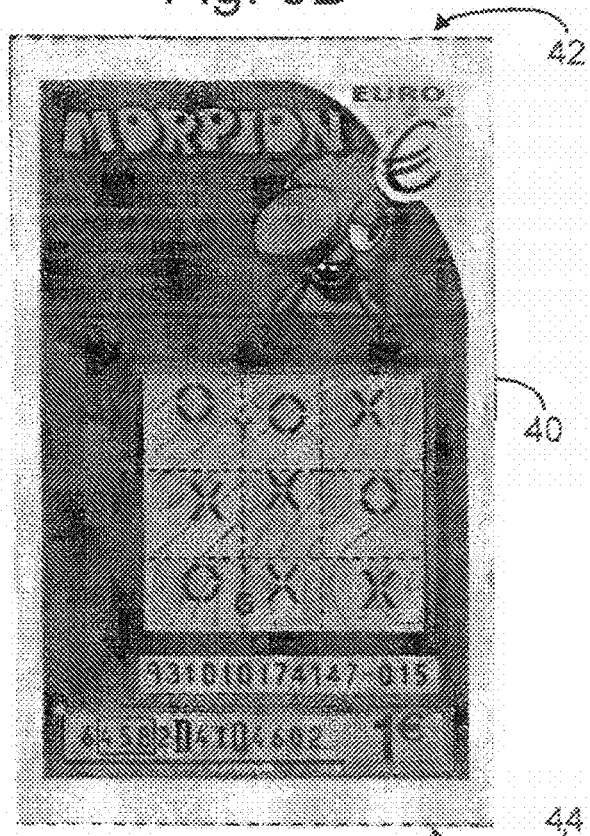
FIG. 4A is one embodiment of a scratch-off lottery ticket with perforated edges.
Figure 4B:
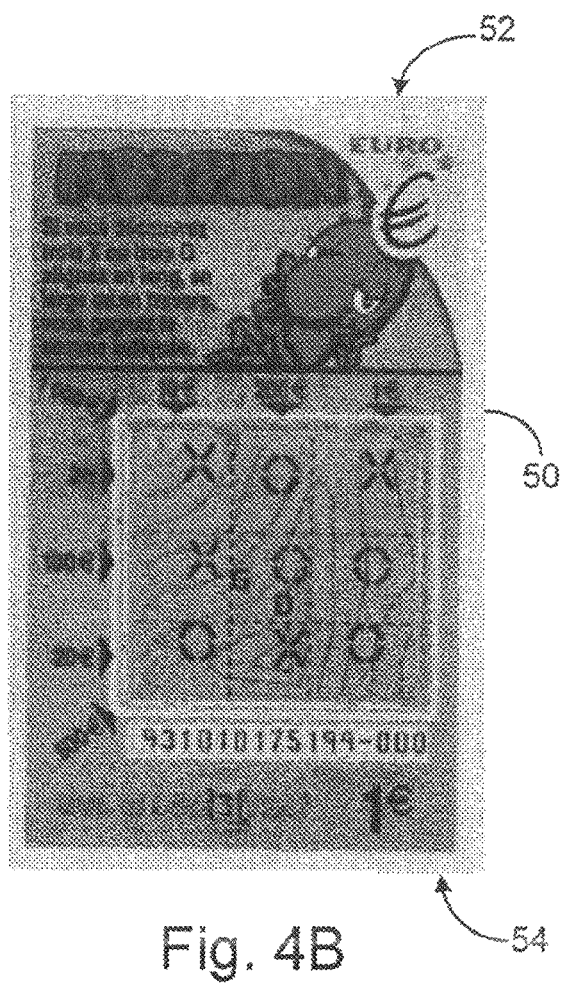
FIG. 4B is a photocopy of the scratch-off lottery ticket which does not display the perforated edges
Figure 5:
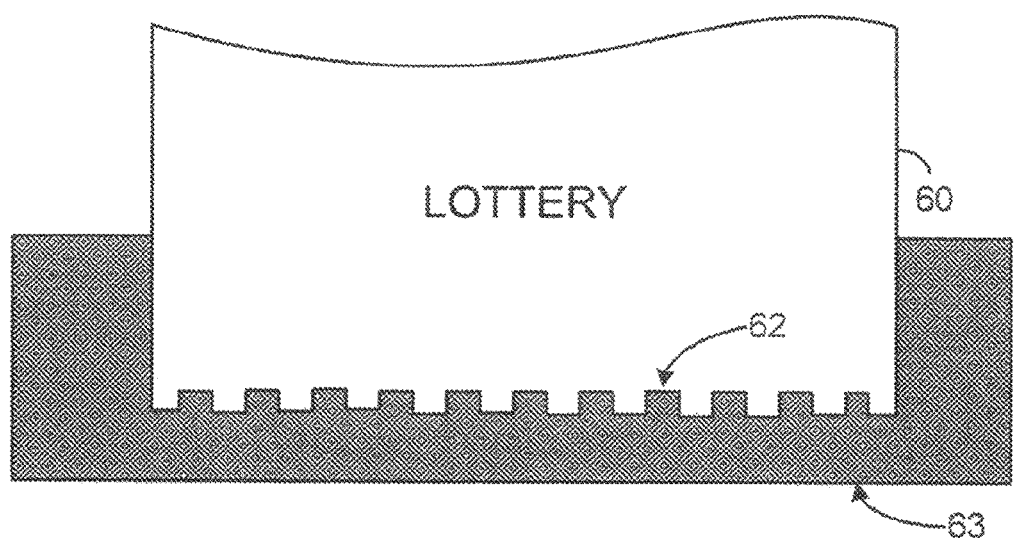
FIG. 5 is one embodiment of a slightly disuniform perforated edge of a lottery ticket.

An alternate method of providing an optical signature and technique for detecting photocopies on scratch-off lottery tickets utilizes the irregular perforation residue on the edges of all scratch-off tickets to differentiate them from photocopies. As shown on the lottery ticket 40 of in FIG. 4, the upper perforations 42 and lower perforations 44 existing on all scratch-off lottery tickets provide a periodic light/dark sequence that is difficult to reproduce. As shown in FIG. 4B, a photocopy of a lottery ticket 50 will have a smooth upper edge 52 and lower edge 54. In a relatively straight forward process, an automated validator can be programmed to process a digital image to look for the periodic perforation sequence along a lottery ticket's edge. If the perforation sequence were detected, the ticket would be assumed authentic. Conversely, if no periodic sequence were detected, the ticket would be assumed to be a photocopy with the appropriate alarm and actions generated.

To eliminate the possibility of the validator confusing a photocopy of a perforation with an actual perforation, the platen of the validator could be printed with an a priori pattern (e.g., stripes, diamonds 63, checkers, spirals). Failure of these platen patterns to synchronize in sequence with the ticket perforations would indicate a photocopy. An alternate verification method is to backlight the platen and thus highlight the perforation residue on an actual ticket.

It can thus be seen that the present invention provides, in one aspect, a method of embedding an optical signature on a substrate 12 including the steps of embedding a first optical pattern on the substrate, such as a code 26 on lottery ticket 20 and then either placing an invisible covering over at least a portion of the first optical pattern, with the invisible covering reflecting light in one or more non-visible wavelengths or fluorescing when exposed to a particular wavelength of light e.g., Infra-red or ultra-violet, or alternately, embedding a first invisible optical pattern on the substrate, as the layer underlying the code 26 in FIG. 2A, and then embedding a second visible optical pattern over at least a portion of the first invisible optical pattern. The invention can include the document with the embedded optical signature, comprised of a substrate (such as substrate 12 of lottery ticket 10) with a first optical pattern embedded on the substrate (either visible such as code 26 with an invisible covering over at least a portion of the first optical pattern, the invisible covering reflecting light in one or more non-visible wavelengths or fluorescing when exposed to a particular wavelength of light e.g., Ultra-violet. Alternately, the document can have an embedded optical signature with a first invisible optical pattern embedded on the substrate (such as the layer under code 46 on lottery ticket 20) and a second visible optical pattern over at least a portion of the first invisible optical pattern, such as code 26.

While the foregoing disclosure shows illustrative embodiments of the invention, it should be noted that various changes and modifications could be made herein without departing from the scope of the invention as defined by the appended Claims. Furthermore, although elements of the invention may be described or claimed in the singular, the plural is contemplated unless limitation to the singular is explicitly stated.

What is claimed is:

1. A method of validating a document having an optical signature comprised of a predefined disuniform edge of the document, comprising the steps of:
   placing the edge of the document against a background; and
   determining if the edge is disuniform and comparing the detected disuniform edge to the known predefined optical signature of the document thereby indicating if the document is valid based on a match between the detected disuniform edge and the optical signature of the document.

2. The method of claim 1, further comprising the steps of:
   retrieving a predefined template of a disuniform edge of a document; and comparing the disuniform edge of the document against the template to determine if the document is valid.

3. The method of claim 1, further comprising the step of placing the edge of the document against a platen having a predefined pattern to thereby determine if a disuniform edge is present.

4. The method of claim 1, wherein the further comprising the step of placing the edge of the document against a backlighted platen to thereby highlight the edge of the document.

5. The method of claim 1, wherein the document is a scratch-off lottery ticket, the step of determining if the edge is disuniform comprising detecting perforation marks along one or more edges of the lottery ticket.

6. The method of claim 5, comprising detecting a periodic sequence generated by the perforation marks.

7. The method of claim 6, comprising generating a digital image of the lottery ticket and analyzing the digital image for a light/dark sequence generated by the perforation marks of a valid lottery ticket.

* * * * *